Sept. 2, 1930.  P. J. CLIFFORD  1,774,787
SAFETY DEVICE FOR RAILROAD CROSSINGS
Filed May 27, 1929  2 Sheets-Sheet 1
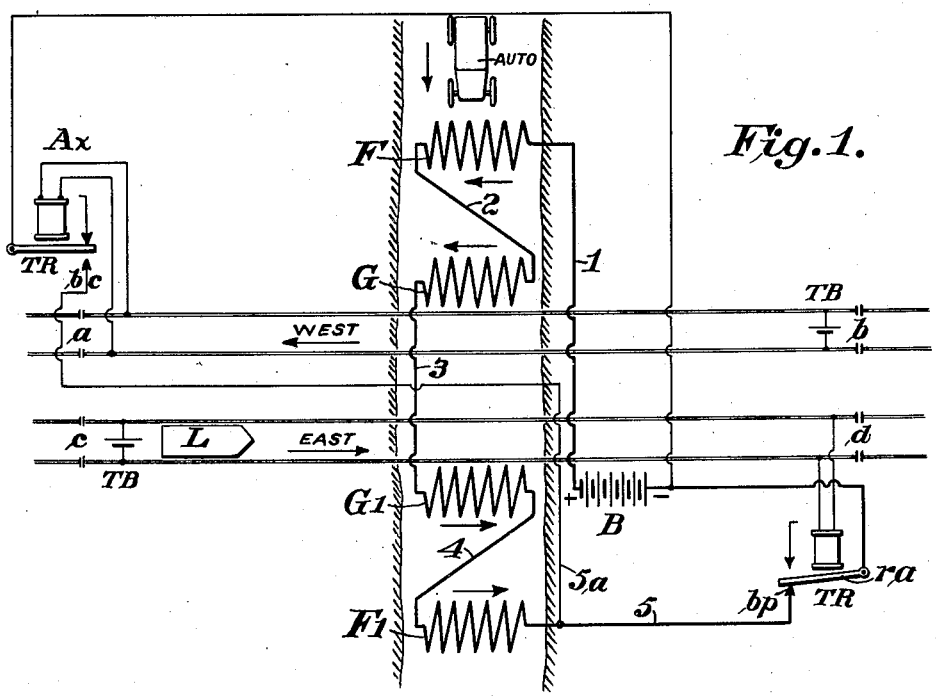
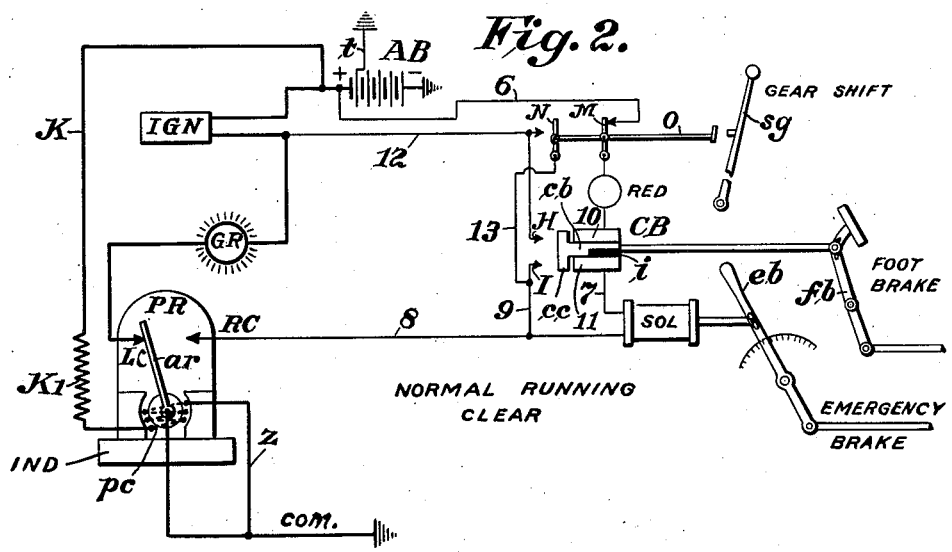
INVENTOR:
Patrick J. Clifford
BY
Spear, Middleton, Donaldson & Hoff
ATTORNEYS

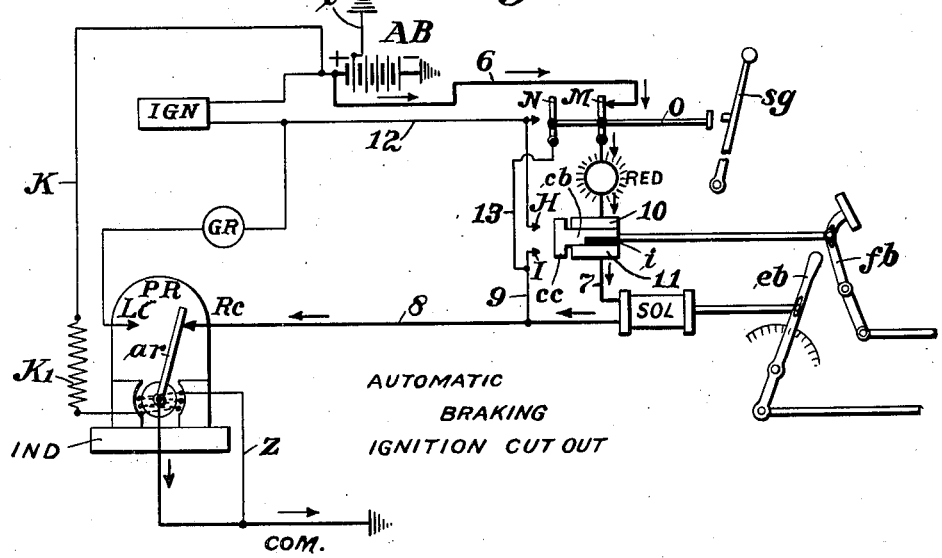
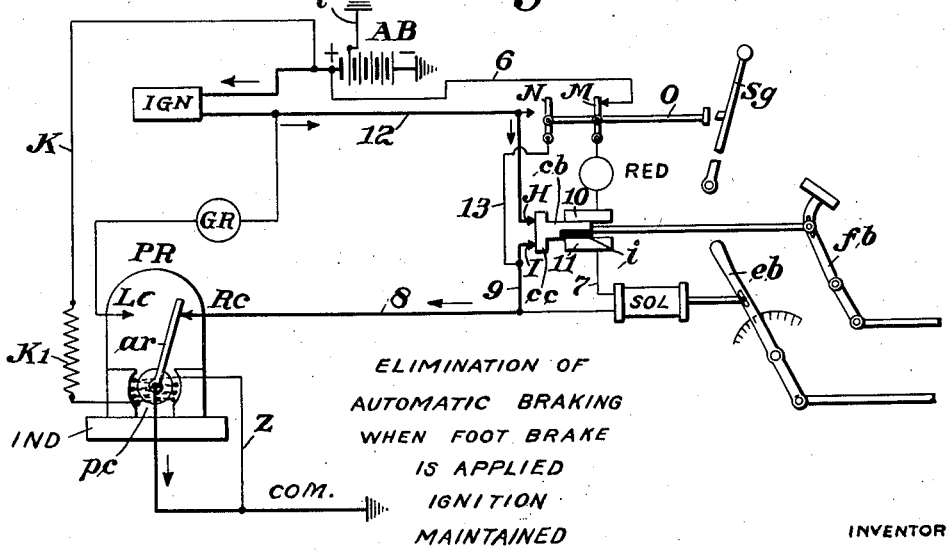

Patented Sept. 2, 1930

1,774,787

UNITED STATES PATENT OFFICE

PATRICK J. CLIFFORD, OF FALLS, PENNSYLVANIA, ASSIGNOR OF ONE-HALF TO J. GEORGE HUFNAGEL, OF SCRANTON, PENNSYLVANIA

SAFETY SERVICE FOR RAILROAD CROSSINGS

Application filed May 27, 1929. Serial No. 366,420.

The present invention relates to the protection of railroad grade crossings inasmuch as it prevents vehicles from crossing the railroad tracks, in either direction over any part of the highway, when a train is approaching the grade crossing from either direction.

My invention includes a primary polarized sensitive relay on an automobile capable of being actuated by a very small amount of current, and inductor coils in the highway wired so that a vehicle will be stopped at the entering side of the railroad crossing but will be allowed to proceed away from the crossing at the departing side with the highway inductors energized.

To accomplish the above I install on an automobile a polarized relay and keep it normally energized positively or with the armature held say on the left contact by means of the battery of the vehicle. This relay is effectively sensitive to a current of low voltage; therefore a suitable resistance is placed in the relay circuit so that its normal contact is maintained in closed position by, say one millivolt. Electrically connected to and being part of the vehicle equipment I employ a solenoid for applying the brakes and a system of lights to indicate the condition of the crossing being approached, i. e., whether the condition is either clear or dangerous.

On the highway, on both sides of the crossing, I place inductors and electrically connect them in circuit so that current will be flowing in one direction in the inductors on one side of the crossing and in the opposite direction in the inductors on the other side of the crossing; that is, the current in the inductors will always be flowing, say rightward, when an auto is approaching a crossing, and leftward when it is leaving the crossing.

The current in the highway inductors is greater and of different polarity from that which holds the primary polarized relay on the vehicle contacted to the left, so that when the vehicle is driven into the induction zone, the coils of the primary relay will be energized by the inductor and the armature of the primary relay forced to its right contact causing functions hereinafter to be described to become effective in controlling the stopping of the car.

I have provided apparatus on the automobile which will automatically stop the same if the driver fails to do so, but which will be eliminated if the driver takes action and applies his foot to the brake pedal. In other words, if the driver is alert and applies his foot brakes, the ignition system will be maintained and the engine running, so that the driver can proceed at once when the danger conditions are removed. If, however, he fails to take action when the automobile enters the energized or danger zone, the brakes will be automatically applied and the ignition will be cut out, so that the driver, after the train has passed out of the block, will then have to start his engine in order to proceed.

If the driver applies the brakes but thereafter releases the same before the danger condition has been removed, the automatic braking will take place as well as the cutting out of the ignition.

Provision is made by which the driver may back away form the energized zone whether the automobile has been stopped by a manual application of the brakes or by an automatic application of the brakes.

In the drawings:

Fig. 1 is a diagram of the installation at the railroad crossing.

Fig. 2 is a diagram of the installation on the automobile.

Fig. 3 is a diagram showing the automobile equipment under the conditions when in the danger zone and with the brakes applied automatically.

Fig. 4 is a diagram showing the automobile equipment under the conditions when in the danger zone and with the brakes applied manually.

Referring to Fig. 1, the two tracks are marked "East" and "West". Each track shows one section or block, between the points $a$, $b$ and $c$, $d$. Track batteries are shown at TB and track relays at TR, these being of the usual character.

At each side of the crossing and in the highway protecting its entire width means are provided to be energized by the approach of a train or vehicle to the crossing on either track. This means when energized is intended to control equipment on the automobile when it gets within the field of activity of said means, so that if the driver of the automobile fails to take action and bring the automobile to a stop, control will be automatically exerted, for instance, upon the ignition system and upon the brake mechanism of the automobile to bring the same to rest before the railroad tracks are reached.

I have shown at F, G, means which are representative of any suitable instrumentalities for creating a field of energy on the vehicle roadway adjacent the tracks of the railroad, and we will suppose, as an example, that these instruments F, G are on the approach side of the crossing, the automobile being indicated at "Auto" and similar instrumentalities $F^1$, $G^1$, are on the departure side of the crossing. The members F and $F^1$ are located more distant from the crossing than the instruments G, $G^1$, say 100 or 150 feet from the crossing, so that as the automobile approaches the crossing, its equipment will be first subjected to the influence of the instrument F, which will cut off the ignition and automatically set the brakes, but if the car has sufficient momentum to pass over this field of energy, i. e., that induced by the instrument F, and the driver still does not take action to stop the car, a second automatic influence will be exerted, when the car arrives within the field of electric energy induced by the instrument at G, and the disabled condition of the automobile driving equipment will be maintained.

The first action at F will either stop the car or at least act as a warning. If this is ignored, then the arresting action will be maintained or made to persist at the instrument G and as the car has been reduced in speed by the action taking place at F, the car will be stopped before it can get upon the railroad track.

While I have just referred to the instruments F, G as being on the approach side of the crossing and the instruments $F^1$, $G^1$, as upon the departing side, it will be understood that this is by way of example only, and that the action will be precisely the same whether the automobile approaches the crossing from one side or the other of the tracks. After being warned by the action of the instrument F, the driver naturally should supplement the automatic braking by applying his foot brakes, but if he does not do so, the automatic braking and the disabling of the ignition system will be made to persist at the instrument G.

The drawing is diagrammatic in character and the coils FG and $F_1 G_1$ are representative of any number or size of instruments necessary to produce the required field at either side of the railroad track. A single coil may be used to create a field sufficient to stop the automobile, or more than one coil may be used. The field created by coils FG is naturally stronger directly over each coil than it is over the wires 2 and 4, which, of course, are likewise energized and surrounded by a field of magnetic flux, hence the motor vehicle will be affected first by the field of F, and then by the field of G, in case it should have sufficient momentum to pass into the field of G, but it will be understood that there is no hiatus in the field between F and G, but on the contrary, the action initiated at F is maintained or made to persist at G.

I have shown the inductors at the points F, G, $F^1$, $G^1$, the circuits to which are controlled by the approach of the train to the crossing. When a train enters the block, say on the "east" bound track, as indicated at L, the track battery of this block will be short circuited and the armature of the track relay TR, shown at the right hand end of this block, will drop on its back point $bp$ and therefore a circuit will be closed as follows: from plus of battery B, line 1, to the right hand end of instrument or inductor F, leftward through this inductor, thence from the left hand end of this inductor through diagonal wire 2 to the right hand end of instrument or inductor G, leftward through this inductor, thence from the left hand end of this inductor through wire 3 to the left hand end of instrument $G^1$ on the opposite side of the tracks, through this inductor in a right hand direction, i. e., opposite to the direction of the current in instrument G, thence through diagonal wire 4 to the left hand end of inductor $F^1$ and rightward through this, i. e., opposite to the direction of flow through inductor F, thence through the wire 5, relay armature $ra$ to minus of battery B.

It will be observed that the current in instruments F and G flows leftward, while in instruments $F^1$ and $G^1$ it flows rightward, and thus the current in relation to the equipment on the vehicle is of one polarity on the approach side of the crossing, say where the instruments F and G are located, whereas upon the opposite side of the crossing, i. e., the departure side, the current is of the opposite polarity in respect to the equipment on the automobile in its continuous passage over the tracks and along the highway.

This disposition of, or change in the polarity of, the energizing current in the highway inductors in respect to the equipment of a vehicle traversing the highway over the crossing, subjects the vehicle to stoppage on the approach side under danger conditions but allows the automobile to depart from the crossing despite the fact that just at the time it enters the outgoing or departure side of the crossing, the re-energizing of the inductors or instruments may take place because of a second train entering the block. In other words, the polarity of the current on the approach side of the crossing will result in stopping the automobile, whereas on the departure side, even though the instruments here are energized, the polarity of the current will be such as not to operate the equipment on the automobile, which therefore can proceed along the highway after passing over the tracks. To put the matter in a different way, a departing automobile can pass over the energized territory on the departure side of the crossing, but an automobile approaching the crossing can not pass over the energized territory here. It might occur that at the moment the automobile gets across the tracks, a train may enter the block and energize the instruments in the highway.

With my improvement, however, this will not prevent the automobile from departing from the crossing as the polarity of the current on the departure side of the crossing is such that it will not operate the equipment on the automobile.

Figs. 2, 3 and 4 are diagrams of the equipment on the automobile. This comprises a polarized primary relay PR, similar to that disclosed in Letters Patent of the United States granted to me May 22 and June 26, 1928, Nos. 1,670,609 and 1,675,252. Normally this relay has its armature ar on the left hand contact LC. This is because the coil pc of the relay is energized from the plus of battery AB through wire K, resistance K¹, coil pc, wire z common wire com, to tap-in t at the negative plate of the battery to give a weak current, say of two volts. It requires but a weak current to hold the armature normally on the left hand contact LC and with the resistance K¹ in circuit, the armature will be held in closed position, i. e., on the left contact LC, by say one millivolt. I have shown the tap-in connection at t going to ground, but the circuit may be a closed circuit without going to ground.

Under this condition, which is equivalent to a "clear" condition, with the green light GR on the vehicle lighted, there will be a circuit from plus of battery AB through the ignition element IGN of the automobile, the green light GR, left contact LC, armature ar, common wire com, to ground, and thence to minus of battery AB. The brake solenoid SOL which is mounted on the automobile and connects with and operates the emergency brake lever eb will be out of circuit, because armature ar is on the left contact LC instead of the right contact RC, and therefore there will be no automatic braking under the above condition and the automobile will be free to be driven over the highway and the de-energized zones thereof adjacent the railway crossings.

If, however, the automobile approaches a crossing at the same time that a train enters or is within the block in which the crossing lies, the inductor IND on the automobile will be energized from the energized zone on the approach side of the highway crossing, and this being of superior voltage and of opposite polarity to the current derived through the resistance K¹ above mentioned, the armature ar of relay PR will swing to the right onto the right hand contact RC, Fig. 3. This will open the circuit through the ignition and the green light and will close a circuit from the plus of battery AB, wire 6, red light Red, indicating danger, circuit breaker CB, wire 7, brake solenoid SOL, wire 8, contact RC, armature ar of the primary relay, and common wire com to ground, and thence to the negative side of the battery AB. The ignition system now being cut off, and the brake having been applied by the solenoid SOL, the automobile will be arrested before it reaches the railroad tracks.

Now when the train has passed out of the block, the inductors or instruments in the highway will be deenergized and the automobile can be started up and proceed over the crossing. If upon getting over the inductors on the departure side of the crossing, another train should enter the block, the automobile can still depart because the polarity of the current is such that it will not move the armature of the primary relay but will press it more firmly against contact LC. It will be noticed in this connection that no matter in which direction the automobile is going, when traversing the approach territory adjacent the crossing, it will be subjected to say a surge of magnetic current flowing rightward, whereas when traversing the departing side of the crossing it will be subjected to a surge of current flowing leftward in the highway instruments. In the first case, i. e., when approaching the crossing the armature of the PR will be set to cut out the ignition and apply the brakes, whereas in the second case, i. e., when departing from the crossing, the armature of the primary relay PR will be on the left hand contact LC with the ignition system cut in and the brake solenoid cut out.

The brake solenoid, as before stated, operates the emergency brake lever. This may have the usual ratchet and pawl for holding the lever in the position to which it is operated in setting the brakes. This mechanism will have the usual arrangement for releasing the emergency brake lever manually.

Means are provided see Fig. 4, whereby if the driver is alert and applies the brakes himself, the ignition system will be maintained and the brake solenoid will not function, even though the automobile gets onto energized territory after the brakes are set by the foot lever. For this purpose I provide a circuit closer cc to close a gap between the points H, I, in wire 9. This circuit closer is connected to the foot brake lever fb so that when fb is set to apply the brakes the circuit closer cc will bridge the gap H I and the ignition circuit will be maintained. At the same time the circuit breaker CB will be operated by the foot brake lever and the solenoid SOL will be cut out and the automatic braking will be eliminated. This circuit breaker CB and the circuit closer cc are in one organization, operated from the foot brake lever fb, and are shown diagrammatically in the drawing. The breaking of the circuit to the solenoid is due to the insulation i breaking electric contact between the parts 10 and 11 of the circuit breaker. At the same time that the solenoid circuit is broken the red lamp "Red" will go out.

It will thus be seen that when the foot brake lever is operated, even though the automobile thereafter gets into energized territory, the automatic braking will be eliminated and the cutting out of the ignition will also be eliminated, so that the automobile will be in condition to proceed as soon as the train clears the block.

This condition of the parts is illustrated in Fig. 4, from which it will be seen that the ignition circuit is from the plus of battery AB, ignition, wire 12, point H, circuit closer cc, point I and wires 9 and 8 to right hand contact RC of primary relay to common wire com to ground, and thence to minus of battery AB. No current passes to the solenoid because the circuit to it is broken at the circuit breaker CB.

Should the driver release his foot brake lever, either through carelessness or incapacity, while the automobile is standing on energized territory on the approach side of the cross, the ignition circuit will be broken at H, I. Thus the ignition system will be put out of service. Further, the circuit to the solenoid will be established at the circuit breaker CB by the movement of the part cb thereof to the right and the emergency brakes will be automatically set by the energizing of the solenoid.

Provision is made whereby a driver may back his car from an energized zone on the approach side of the crossing. For this purpose I provide a circuit closer M in the circuit wire leading to the solenoid and a circuit closer N in the branch 13 of the ignition circuit, which branch connects with wire 9. As is well known, the gear shift lever sg when in reverse is moved straight forward from its "low" position. When it is so moved, it will operate a connection O so as to open the circuit at M and close the circuit at N, and therefore, notwithstanding the fact that the foot brake lever is released, breaking the circuit at H, I, and closing it at CB, the solenoid and red light "Red" will be cut out and the ignition will be maintained, and therefore the operator may back his car off from the energized zone, provided he releases his emergency brake. This action of backing may be carried out whether the braking of the car has been effected either by the foot brake or by the solenoid. If the braking has been effected automatically by the solenoid, then the act of setting the gear shift lever sg in reverse will break the circuit to the solenoid. If, on the other hand, the braking of the car has been done by the foot brake, the ignition circuit will be broken at H, I, as soon as the foot brake lever is withdrawn, but this break in the circuit will be restored or re-established at N when the gear shift lever is set in reverse, so that under this condition the automatic braking will be eliminated and the ignition system established so that the automobile can be moved backward.

When a train enters the block on the west bound track, the course of the current through the highway inductors will be the same as that above described, starting with the plus of battery B. After leaving the inductor $F^1$, however, the current, under the condition just mentioned, i. e., with a train on the west bound track, will flow through wire $5^a$ to back contact bc of track relay Ax, armature of that relay and thence to the minus of battery B. Thus the effect on the automobile equipment will be the same whether the train is approaching the crossing on either the "east" or "west" track.

It is obvious that in the event of two trains being in the block at the same time though not having entered the block at the same time, the highway zones will remain energized until both have departed from the block.

I claim:

1. In apparatus for preventing accidents at railroad crossings, means for producing zones of electric energy in the highway on opposite sides of the railroad, the polarity of the zone on one side of the railroad being opposite to that of the zone on the other side of the railroad for one direction of travel along said highway and means on an automobile operated by the electric energy of the zone on the approach side of the railroad to stop the automobile, said means being inoperable to stop the automobile by the relatively opposite polarity energy on the departure side of the crossing, substantially as described.

2. Apparatus according to claim 1 in which the means on the automobile comprises a polarized relay, which under electric energy of one polarity derived from a source on the automobile will maintain the ignition system and cut out automatic braking mechanism on the automobile, and under electric energy of the opposite polarity derived from the approach zone of the highway will cut out the said ignition system and cause energizing of the brake applying mechanism to apply the brake, substantially as described.

3. Apparatus according to claim 1 in which a polarized relay on the automobile will be operated by the energy of one polarity on the approach side of the crossing but will not be similarly operated by the electric energy of opposite polarity on the departure side of the crossing, and means controlled by said relay when operated by the energy on the approach side for stopping the automobile, substantially as described.

4. In apparatus of the class described, inductors in a highway on each side of a railroad, and means for energizing said inductors when a train approaches the crossing for producing electric energy of one polarity on the approach side of the crossing and of opposite polarity on the departure side of the crossing relative to travel in one direction along the highway, and means on an automobile operable to stop the same on the approach side of the crossing and inoperable to stop the automobile on the departure side of the crossing, substantially as described.

5. In apparatus of the class described, a track battery, a track relay, a source of electrical energy, inductors in a highway on opposite sides of a railroad crossing and circuit connections including the armature of the track relay for directing electric current from said source in one direction through the inductor on the approach side of the crossing and in the opposite direction through the inductor on the departure side of the crossing, in respect to unidirectional travel of an automobile over the crossing, and means on the automobile operable by the current of one polarity on the approach side for stopping the automobile, but inoperable by the current of opposite polarity on the departure side of the crossing, substantially as described.

6. In apparatus of the class described, means on a highway adjacent a railroad crossing to be energized on the approach of a train, means on an automobile for stopping the same, when the automobile arrives within the zone of influence of said energized means in the highway, and means for eliminating the stopping means by reversing the drive mechanism of the automobile whereby said automobile may be backed away from said crossing, substantially as described.

7. Apparatus according to claim 6 in which the eliminating means is operated by the gear shift lever when this is set in reverse position.

8. Apparatus according to claim 6 in which the stopping means includes a cut out for the ignition system and an electrically operated brake mechanism, and the eliminating means includes means for re-establishing the ignition system and cutting out the electrically operated brake mechanism when the gear shift lever is set in reverse, substantially as described.

9. Apparatus of the class described comprising electrical appliances in a highway adjacent and on opposite sides of a crossing, means for energizing said appliances with current of one polarity on the approach side of the crossing and of opposite polarity on the departure side of the crossing, relative to one direction of travel of an automobile over the crossing, a primary relay operated in one direction by the electrical energy on the approach side of the crossing, said relay operating in the opposite direction on the departure side of the crossing, brake mechanism on the automobile operated automatically by current derived through said relay when operated by the electrical energy on the approach side of the crossing, an ignition system for the automobile which is automatically cut out by the last mentioned operation of the relay, a manually operable brake with means for maintaining the ignition circuit and for eliminating automatic braking when the manual brake is operated, a gear shift lever and means for re-establishing the ignition system and cutting out the electrical power of the automatic braking system when the gear shift lever is set in reverse, substantially as described.

10. Apparatus of the class described, a primary relay on an automobile having a first contact to energize the ignition system, and a second contact to energize brake mechanism and having also an armature to engage either contact, a source of current and a circuit on the automobile for energizing the relay to hold its armature on the first mentioned contact for maintaining the ignition system on and the brake off, electrical appliances in a highway adjacent a crossing with means for energizing the same when a train approaches the crossing, the electrical energy produced by the highway appliance on the approach side of the crossing being of opposite polarity and superior voltage in respect to the current in the circuit on the automobile to move the armature onto the second contact for cutting out the ignition and setting the brakes, substantially as described.

11. Apparatus according to claim 10 in which the electrical appliances on the departure side of the crossing produces an electrical influence of the same polarity as that of the circuit on the automobile which holds the armature on the first contact, thus permitting the automobile to depart with its brake off and ignition on.

12. In apparatus of the class described, a primary relay on an automobile having a first contact to energize the ignition system, and a second contact to energize brake mechanism and having also an armature to engage either contact, a source of current and a circuit on the automobile for energizing the relay to hold its armature on the first mentioned contact for maintaining the ignition system on and the brake off, electrical appliances in a highway adjacent a crossing with means for energizing the same when a train approaches the crossing, the said electrical energy induced by the highway appliance being of superior strength in respect to the current in the circuit in the vehicle to move the armature onto the second contact for cutting out the ignition and setting the brakes, substantially as described.

13. A polarized relay on a motor vehicle, a circuit including said relay to bias the armature of the relay to normally hold it on one contact, a second contact in a circuit including brake mechanism, and an instrument in a roadway, over which the motor vehicle passes, to create a zone of electrical influence of superior strength and opposite polarity to the first mentioned circuit on the vehicle, for throwing the armature onto the second contact, the ignition element of the motor vehicle being included in the first mentioned circuit.

14. In a railway crossing safety appliance, a primary polarized relay on a motor vehicle in which there is a contact included in an ignition circuit and against which the armature of the primary relay normally bears, a second contact for a circuit which includes automatic brake means, and means in a roadway to create an electrically energized zone of superior strength in respect to the current in the said ignition circuit, for operating the primary relay to move its armature from the first to the second contact thereby breaking the ignition circuit and automatically applying the brakes.

15. Apparatus according to claim 1 in which each electrically energized zone occupies approximately the entire width of the highway so that a vehicle approaching the railroad has no pathway across said railroad except over the area equipped for energization and for stopping said vehicle.

16. Apparatus according to claim 10 in which a manual brake is employed which when operated eliminates automatic braking and maintains the ignition system on, substantially as described.

In testimony whereof, I affix my signature.

PATRICK J. CLIFFORD.